US012547049B2

(12) United States Patent
Yuan et al.

(10) Patent No.: US 12,547,049 B2
(45) Date of Patent: Feb. 10, 2026

(54) RECONFIGURABLE ELECTRO-OPTICAL LOGIC GATE TO PERFORM MULTIPLE LOGIC OPERATIONS

(71) Applicant: HEWLETT PACKARD ENTERPRISE DEVELOPMENT LP, Spring, TX (US)

(72) Inventors: Yuan Yuan, Milpitas, CA (US); Thomas Van Vaerenbergh, Flemish Brabant (BE); Antoine Descos, Santa Barbara, CA (US); Stanley Cheung, Milpitas, CA (US); Wayne Sorin, Mountain View, CA (US); Yiwei Peng, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 302 days.

(21) Appl. No.: 18/485,452

(22) Filed: Oct. 12, 2023

(65) Prior Publication Data
US 2025/0123536 A1    Apr. 17, 2025

(51) Int. Cl.
*G02F 3/00* (2006.01)
*G02F 1/21* (2006.01)
(Continued)

(52) U.S. Cl.
CPC .............. *G02F 3/022* (2013.01); *G02F 1/212* (2021.01); *G02F 1/3133* (2013.01); *G02F 3/00* (2013.01)

(58) Field of Classification Search
CPC .................................. G02F 1/212; G02F 3/00
See application file for complete search history.

(56) References Cited

U.S. PATENT DOCUMENTS 5,315,422 A * 5/1994 Utaka .................... G02F 1/3517
385/5
6,097,525 A * 8/2000 Ono ..................... H04B 10/505
398/186
(Continued)

FOREIGN PATENT DOCUMENTS

JP       2012119759 A * 6/2012 ........... H04B 10/614

OTHER PUBLICATIONS

Ishizaka et al., "Design of ultra compact all-optical XOR and AND logic gates with low power consumption", Optics Communications 284, 2011, pp. 3528-3533.
(Continued)

*Primary Examiner* — Charlie Y Peng
(74) *Attorney, Agent, or Firm* — Hewlett Packard Enterprise Patent Department

(57) ABSTRACT

An example optical system having an electro-optical (EO) logic gate connected to a controller is presented. The controller modulates a first encoded electrical signal and a second encoded electrical signal based on an operation selection input. The EO logic gate includes a first Mach Zehnder interferometer (MZI) coupled between an optical input port and an optical output port; a second MZI optically coupled in parallel with the first MZI; a first phase shifter adjacent to the first MZI and; and a second phase shifter adjacent to the second MZI. The phase shifters apply phase shifts to the optical signals propagating via the first and second MZIs based on the modulated first encoded electrical signal and the modulated second encoded electrical signal to cause an optical output at the optical output port to vary based on the logic operation of the first encoded electrical signal and the second encoded electrical signal.

20 Claims, 6 Drawing Sheets

(51) Int. Cl.
  *G02F 1/313* (2006.01)
  *G02F 3/02* (2006.01)

(56) References Cited

U.S. PATENT DOCUMENTS

| | | | |
|---|---|---|---|
| 6,421,155 B1 * | 7/2002 | Yano | H04B 10/5167 398/183 |
| 2007/0098413 A1 | 5/2007 | Kim et al. | |
| 2019/0310070 A1 | 10/2019 | Mower et al. | |

OTHER PUBLICATIONS

Kumar et al., "Proposed new approach to the design of universal logic gates using the electro-optic effect in Mach-Zehnder interferometers", vol. 54, No. 28, Oct. 1, 2015, 6 pages.

Lin et al., "Reconfigurable electro-optical logic gates using a 2-layer multilayer perceptron", 2022, 7 pages.

Qiu et al., "Demonstration of reconfigurable electro-optical logic with silicon photonic integrated circuits", Optics Letters, vol. 37, No. 19, Oct. 1, 2012, 3 pages.

Ying et al., "Automated logic synthesis for electro-optic logic-based integrated optical computing", vol. 26, No. 21, Oct. 2018, 11 pages.

Zakaria et al., "Recent Advances in Electrical and Electronic Engineering and Computer Science", ICCEE, 2021, 162 pages.

Zarei et al., "Realization of optical logic gates using on-chip diffractive optical neural networks", 2022, 13 pages.

Zhang et al., "Electro-optic directed logic circuit based on microring resonators for XOR/XNOR operations", Optics Express, May 2012, 11 pages.

Kim, J-Y et al., "All-Optical Multiple Logic Gates with XOR, NOR, OR, and NAND Functions Using Parallel SOA-MZI Structures: Theory and Experiment," Sep. 2006, Journal of Lightwave Technology, vol. 24, No. 9, pp. 3392-3399.

* cited by examiner

RECONFIGURABLE ELECTRO-OPTICAL LOGIC GATE TO PERFORM MULTIPLE LOGIC OPERATIONS

BACKGROUND

Optical computing has gained extensive attention due to its enhanced performance over traditional electronic computing in terms of speed, energy efficiency, and immunity to electromagnetic interference. Optical computing systems generally process data in an optical form using optical circuits. Certain optical circuits use electro-optical (EO) logic gates to perform logic operations. A traditional EO logic gate is generally designed to perform a pre-defined logic operation, whereas to perform another type of logic operation, another type of EO logic gate may be used. For instance, a traditional EO logic gate that is designed to perform an 'OR' operation cannot perform an 'AND' operation. Typically, data processing entails performing several logic operations. The use of such traditional EO logic gates in an optical computing system for data processing may require implementing several EO logic gates, resulting in an increase in the size and complexity of the optical system.

BRIEF DESCRIPTION OF THE DRAWINGS

Various examples will be described below with references to the following figures.

Figure 1:
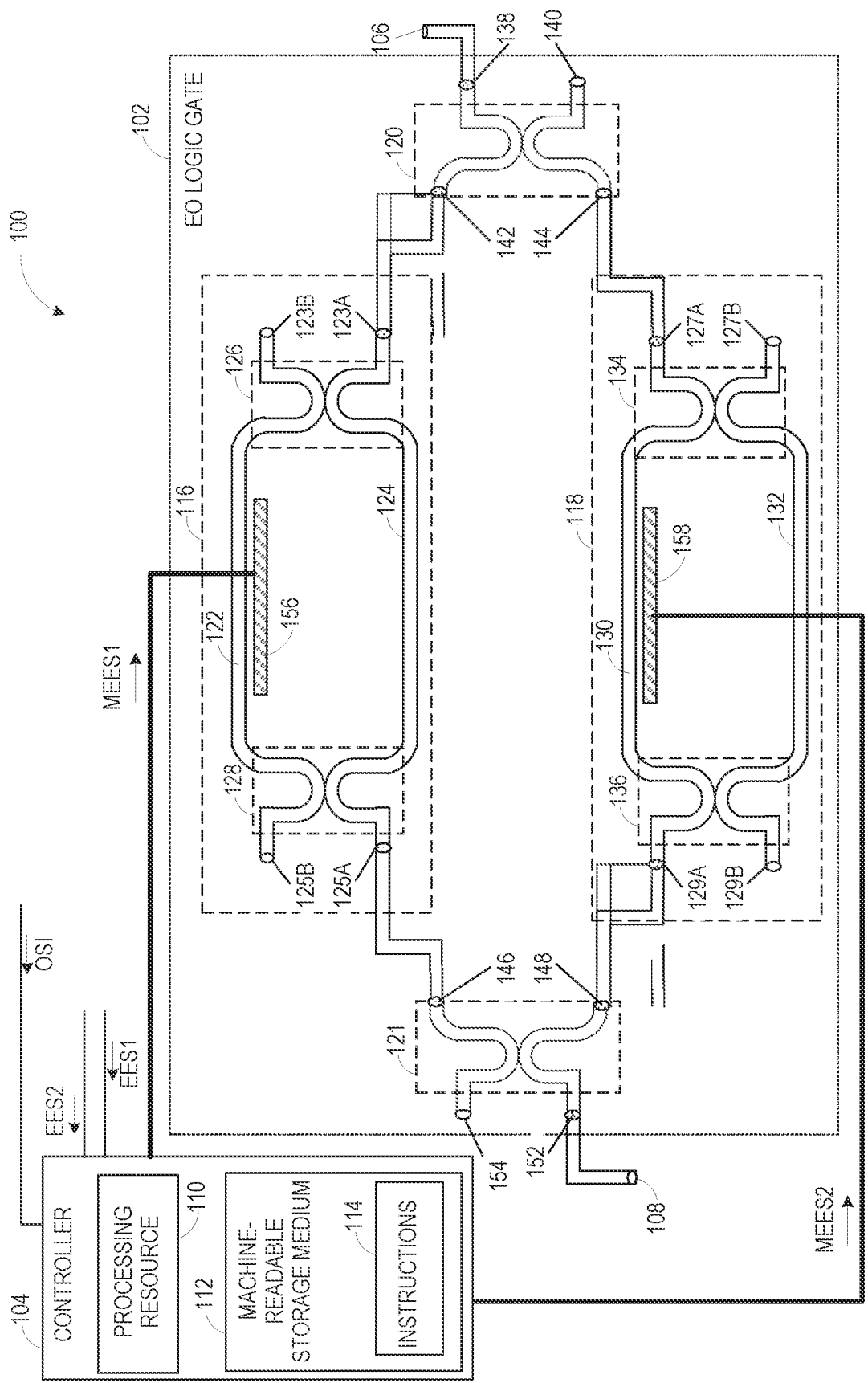
FIG. 1 depicts a schematic diagram of a system including an example electro-optical (EO) logic gate.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Over the past decade, photonic integrated circuits (PICs) have advanced dramatically, providing a platform for large-scale photonic circuits where information can be transmitted and/or processed at the speed of light. Optical interconnects, for example, have accomplished remarkable success in supplanting electrical interconnects, from long-haul communication to inter datacenter communication and even inter-chip communication, demonstrating the immense potential and distinctive advantages of PICs. Similarly, employing photons to process information may overcome the bottleneck of electronic computing by minimizing the concerns of low clock frequency, high latency, and high heat generation.

Logic gates such as all-optical logic gates and electro-optical (EO) logic gates are the fundamental components for computing. In particular, the all-optical logic gates and the EO logic gates offer much smaller latency compared to their electronic counterparts. An all-optical logic gate generally includes a network of optical components such as photonic crystals, microring resonators (MRRs), Mach-Zehnder Interferometers (MZIs), optical waveguides, and optical couplers, arranged in a predefined physical layout to perform one or more pre-set logic operations, wherein an optical output signal corresponding to a given logic operation may be obtained at a respective output port. A traditional, all-optical logic gate performs more than one pre-set logic operation. However, as the number of logic operations that an all-optical logic gate is designed to perform increases, the all-optical logic gate may require an increased number of components resulting in a large footprint and complex design. Also, once manufactured, such an all-optic logic gate cannot perform logic operations other than the pre-set logic operations that it is designed for without changing its design layout, device specifications, or providing multiple input wavelengths.

Some existing EO logic gates may use an arrangement of MZIs to perform respective single logic operations. For instance, a first existing EO logic gate is comprised of a series-coupled two MZIs to perform a NOR logic operation; and a second existing EO logic gate is comprised of a series-parallel connection of three MZIs to perform a NAND logic operation. In particular, in the first existing EO logic gate, an application of two voltage signals—X and Y, to the MZIs results in an optical output representative of an operation "X NOR Y", whereas the application of the two voltage signals—X and Y, to the MZIs of the second existing EO logic gate results in the optical output representative of an operation "X NAND Y". The applied voltages control the phase change caused via each MZI in the respective logic gates. The phase change is controlled by the applied voltages to realize the logic operations "X NOR Y" or "X NAND Y." However, each of these existing EO logic gates is limited in performing its respective single pre-set logic operation. Other logic operations cannot be performed by each existing EO logic gate without any structural modifications.

Moreover, the use of traditional all-optic or EO logic gates with pre-set capabilities may lead to increased component count for optical computing systems, even for small-scale optical computing systems. The increase in the component count increases the cost, complexity, and footprint of optical computing systems, thereby limiting the scaling of such optical computing systems for larger and more compute-intensive applications.

In examples consistent with the teachings of this disclosure, proposed is a reconfigurable EO logic gate capable of performing multiple logic operations without structural modifications or the need for separate output ports. The proposed EO logic gate includes two MZIs (e.g., a first MZI and a second MZI) connected in parallel with each other between an optical input port and an optical output port. Further, the EO logic gate includes a first phase shifter formed adjacent to the first MZI and a second phase shifter formed adjacent to the second MZI. The first phase shifter and the second phase shifter are connected to a controller to receive a modulated first encoded electrical signal and a modulated second encoded electrical signal, respectively. The controller is configured to control modulation of the first and second encoded electrical signals such that a particular logic operation can be performed via the proposed EO logic gate.

The controller receives an operation selection input specifying the particular logic operation to be performed via the EO logic gate. The controller modulates the first encoded electrical signal and the second encoded electrical signal based on the operation selection input to generate the modulated first encoded electrical signal and the modulated second encoded electrical signal. In particular, the controller may modulate the first and second encoded electrical signals by adjusting a signal property (e.g., power level, voltage level, current level, etc.) of the first and second encoded electrical signals. Application of these modulated encoded electrical signals to the respective phase shifters causes the phase shifters to apply a predetermined amount of phase shifts to the optical signals passing via the first and second MZIs. The applied phase shifts in turn control the optical output signal appearing at the optical output port of the EO logic gate. In particular, the phase shifts cause the optical output signal to vary based on the particular logic operation of the first encoded electrical signal and the second encoded electrical signal.

As will be appreciated, the proposed EO logic gate is configurable and can perform multiple logic operations, such as an AND operation, OR operation, NAND operation, NOR operation, XOR operation, ADD operation, or NXOR operation, by programming the modulation of input signals (e.g., the first and second encoded electrical signals). Further, the proposed EO logic gate has a simple layout and is capable of performing multiple logic operations without requiring structural and layout design changes to the EO logic gate. Therefore, the proposed EO logic gate can be easily scaled up for use in complex and/or large-scale optical computing systems by replicating the same design for each EO logic gate. Moreover, photonic integrated circuits may be designed to allow the proposed EO logic gates to be reprogrammed (e.g., by way of customizing modulation of the encoded electrical signals), and may therefore be capable of being used as field-programmable gate arrays (FPGAs).

Referring now to the drawings, in FIG. 1, a schematic diagram of a system 100 is depicted. The system 100 may be implemented as a photonic integrated circuit (PIC) which may be deployed in optical interconnects enabling inter datacenter communication and/or inter-chip communication. In some examples, the system 100 may be implemented in electro-optical computing systems, optical neural networks, optical machine learning architectures, programmable photonic networks, etc. In one example, the system 100 may be implemented in electronic devices such as computers (stationary or portable), servers, storage systems, wireless access points, network switches, routers, docking stations, printers, or scanners.

In an example implementation depicted in FIG. 1, the system 100 includes an EO logic gate 102, and a controller 104 connected to the EO logic gate 102 to control the functioning thereof. The EO logic gate 102 is coupled between an optical input port 106 and an optical output port 108 of the system 100. In particular, the optical input port 106 may be connected to an optical source (e.g., laser, not shown) to receive optical input, and an optical output of the system 100 may be obtained from the optical output port 108.

The controller 104 may supply input electrical signals (e.g., modulated encoded electrical signals) to the EO logic gate 102 and control what logic operation the EO logic gate 102 will perform on the supplied input electrical signals. In particular, the proposed EO logic gate 102 can perform several logic operations on the input electrical signals depending on certain signal properties of the input electrical signals received from the controller 104. The EO logic gate 102 may generate the optical output based on a logical combination of the input signals received from the controller 104. For example, the EO logic gate 102 may receive an input optical signal from the optical input port 106 and may generate the optical output signal by performing any of an AND, OR, NAND, NOR, XOR, ADD, or NXOR operations on the supplied input electrical signals. Such optical output signal may be obtained from the optical output port 108.

The controller 104 may be implemented using a processing resource 110 and a machine-readable storage medium 112, in some examples. The processing resource 110 may include a processor (e.g., central processing unit), a microcontroller, and/or a special-purpose processor. The machine-readable storage medium 112 may store program instructions, for example, the instructions 114, that when executed by the processing resource 110 of the controller 104 may cause the processing resource 110 to perform operations intended to be performed by the controller 104. For example, the processing resource 110 may fetch, decode, and execute the instructions 114 to control the functioning of the EO logic gate 102 by supplying modulated encoded electrical signals to the EO logic gate 102.

The machine-readable storage medium 112 may be any electronic, magnetic, optical, or any other physical storage device that contains or stores the instructions 114 that are readable and executable by the processor. Thus, the machine-readable storage medium 112 may be, for example, Random Access Memory (RAM), non-volatile RAM (NVRAM), an Electrically Erasable Programmable Read-Only Memory (EEPROM), a storage device, an optical disc, or the like. In some embodiments, the machine-readable storage medium 112 may be a non-transitory storage device, where the term "non-transitory" does not encompass transitory propagating signals. In some examples, the controller 104 may include a control logic, electronic circuits, an integrated circuit (IC) chip such as, but not limited to, an application-specific integrated circuit (ASIC), a field-programmable gate array (FPGA), or combinations thereof that include several electronic components, that may be designed to generate the modulated encoded electrical signals.

The proposed EO logic gate 102 is configured to perform multiple logic operations without needing structural modifications or the need for separate output ports. In particular, the EO logic gate 102 receives the modulated encoded electrical signals (e.g., MEES1 and MEES2) from the controller 104 and generates an optical output signal by performing a logical operation on the modulated encoded electrical signals. The proposed EO logic gate 102 is implemented via two MZIs, for example, a first MZI 116 and a second MZI 118. The first MZI 116 and the second MZI 118 are connected in parallel with each other between the optical input port 106 and the optical output port 108. In particular, in one example, the first MZI 116 and the second MZI 118 are connected in parallel with each other via an input optical coupler 120 and an output optical coupler 121. Each of the optical couplers 120 and 121 may be 50%-50% directional couplers, in some examples.

Each of the MZIs 116 and 118 may include a set of optical waveguide arms (hereinafter referred to as MZI arms) connected in parallel with each other via optical couplers (hereinafter referred to as MZI couplers). Further, each of the MZIs 116 and 118 includes respective optical input ports (hereinafter referred to as MZI input ports) and respective optical output ports (hereinafter referred to as MZI output ports). For example, the MZI 116 includes MZI arms 122 and 124 coupled in parallel to each other via the MZI couplers 126 and 128. The MZI 116 comprises MZI input ports 123A, 123B and MZI output ports 125A, 125B. Similarly, the MZI 118 may also include MZI arms 130 and 132 coupled in parallel to each other via the MZI couplers 134 and 136. The MZI 118 comprises MZI input ports 127A, 127B and MZI output ports 129A, 129B. Each of the MZI arms 122, 124, 130, and 132; and the MZI couplers 126, 128, 134, and 136 may have an optical waveguide to allow propagation of the optical signals (e.g., light) therethrough during the operation of the EO logic gate 102. In an example configuration of the EO logic gate 102, each of the optical couplers 126, 128, 134, and 136 may be 50%-50% directional couplers.

The input optical coupler 120 comprises input ports 138, 140, and output ports 142, and 144. The input optical coupler 120 is connected between the MZIs 116, 118 and the optical input port 106 of the system 100. In particular, one of the input ports (e.g., the input port 138) of the input optical coupler 120 is coupled to the optical input port 106 to receive an input optical signal. Another input port (e.g., the input port 140) of the input optical coupler 120 may be kept floating (e.g., open-ended). Further, the output ports 142, 144 of the input optical coupler 120 may be coupled to one MZI input port of each of the MZIs 116 and 118. For example, as depicted in FIG. 1, the output ports 142, 144 are coupled with the MZI input ports 123A and 127A, whereas the MZI input ports 123B and 127B are kept floating. Accordingly, when the input optical signal is received at the optical input port 106, the input optical coupler 120 distributes the input optical signal into the first MZI 116 and the second MZI 118.

Further, the output optical coupler 121 comprises input ports 146, 148 and output ports 152, 154. The output optical coupler 121 is connected between the MZIs 116, 118 and the optical output port 108 of the system 100. In particular, one of the output ports (e.g., the output port 152) of the output optical coupler 121 is coupled to the optical output port 108. Another output port (e.g., the output port 154) may be kept floating (e.g., open-ended). Further, the input ports 146, 148 of the output optical coupler 121 may be coupled with one MZI output port of each of the MZIs 116 and 118. For example, as depicted in FIG. 1, the input ports 146, 148 are coupled with the MZI output ports 125A and 129A, respectively, whereas the MZI output ports 125B and 129B are kept floating. Accordingly, the output optical coupler 121 combines optical signals received from the MZIs 116, 118 and distributes them among the output ports 152, 154 as the optical output signal of the system 100.

Furthermore, the EO logic gate 102 includes a first phase shifter 156 formed adjacent to the first MZI 116 and a second phase shifter 158 formed adjacent to the second MZI 118. In particular, the phase shifter 156 is formed adjacent to the MZI arm 122 of the MZI 116, and the phase shifter 158 is formed adjacent to the MZI arm 130 of the MZI 118. The phase shifters 156 and 158 are connected to the controller 104 to receive the modulated encoded electrical signals MEES1 and MEES2, respectively. The phase shifters 156 and 158 may be implemented as one or more of metal heaters, PN junction phase shifters, PIN junction phase shifters, metal-oxide-semiconductor capacitor (MOSCAP) phase shifters, or Lithium Niobate phase shifters. For illustration purposes, the phase shifters 156 and 158 are described as being metal heaters. It is to be noted that, the examples presented herein are not limited to the type of phase shifters 156 and 158. Any suitable arrangement capable of inducing a phase shift may be implemented as the phase shifters 156 and 158.

In an example implementation where the phase shifters 156 and 158 are metal heaters, an application of electrical power to the phase shifters 156 and 158 via the controller 104 may cause the phase shifters 156 and 158 to generate heat that changes material properties (e.g., charge carrier densities) locally inside the respective MZI arms 122, 130. The changes in the charge carrier densities in the MZI arms near the phase shifters 156 and 158 may change the refractive index of the respective MZI 116 or 118. For example, an increase in the charge carrier densities may reduce the refractive index, whereas a decrease in the charge carrier densities may increase the refractive index. The change in the refractive index may cause the wavelength of the optical signals passing through the MZIs 116, 118 to vary, thereby inducing phase shifts in the optical signals passing through the MZIs 116, 118.

During operation, the controller 104 may receive encoded electrical signals, for example, a first encoded electrical signal (EES1) and a second encoded electrical signal (EES2), from external circuits or devices to perform a logic operation. The encoded electrical signals may be a signal including a series or a burst of logic states "0" and "1". The external circuits or devices (not shown) may also instruct the controller 104 to perform the logic operation by sending the operation selection input (OSI) specifying the logic operation the EO logic gate 102 will perform on the supplied modulated encoded electrical signals. The operation selection input may be received by the processing resource 110 via any input means (not shown), for example, keyboard, mouse, joystick, voice command, video command, touchscreen, etc. The logic operation can be any of the AND, OR, NAND, NOR, XOR, ADD, or NXOR operations. Table-1 represented below depicts certain example operation selection inputs and respective logic operations. Although the example operation selection inputs shown in Table-1 are represented as three-digit binary codes, the operation selection inputs can be represented and/or implemented in any other suitable forms without limiting the scope of the present disclosure. By way of example, the operation selection input may be any suitable combination of numerals, alphabets, or symbols.

TABLE 1

Example operation selection inputs and respective logic operations

| Operation selection input | Logic Operation |
|---|---|
| 000 | ADD |
| 001 | AND |
| 010 | OR |
| 011 | NAND |
| 100 | NOR |
| 101 | XOR |
| 110 | NXOR |

In some examples consistent with the proposed disclosure, the controller 104 is configured to selectively control the phase shifts applied to the optical signals propagating inside the MZIs 116 and 118, thereby achieving a desired optical output signal representing a predetermined logical combination of the encoded electrical signals received by the controller 104. In order to perform the logic operation on the encoded electrical signals, the controller 104 is configured to generate the modulated encoded electrical signals, for example, a modulated first encoded electrical signal (MEES1) and a modulated second encoded electrical signal (MEES2) by adjusting one or more signal properties (e.g., power magnitude, voltage magnitude, current magnitude, phase difference, etc.) of the encoded electrical signals EES1 and EES2, respectively. The MEES1 may be applied to the first phase shifter 156 and the MEES2 may be applied to the second phase shifter 158. In one example, the controller 104 may select the magnitudes of the modulated encoded electrical signals (e.g., MEES1 and MEES2) such that when these modulated encoded electrical signals are applied to the phase shifters 156 and 158, the optical output signal at the optical output port 108 would represent a predetermined logical combination of the modulated encoded electrical signals. For the purpose of illustration hereinafter, in an implementation in which the phase shifters 156, 158 are metal heaters, the controller 104 is configured to modulate the encoded electrical signals by way of adjusting the power magnitudes of the encoded electrical signals.

For the controller 104 to control the modulation of the encoded electrical signals, the controller 104 is pre-programmed with electrical configuration data that defines signal properties of the modulated encoded electrical signals supplied to the EO logic gate 102 to perform a given logic operation. In the system 100 of FIG. 1, the phase difference between the outputs of the two MZIs 116 and 118 determines the output optical power of the system 100. The electro-optical effect and interference between the optical signals received at the output optical coupler 121 together provide a nonlinear optical response versus the phase changes of the two MZIs 116 and 118. In particular, the output optical power at the optical output port 108 shows periodic patterns for different values of the power magnitudes applied to the phase shifters 156 and 158. The electrical configuration data may be derived based on the analysis of the output optical power at the output port 108 for several different power magnitudes applied to the phase shifters 156 and 158.

As depicted in Table 2 presented below, the electrical configuration data includes the mapping between a logic operation and corresponding power magnitudes of the applied signals to the phase shifters 156 and 158, for example. In particular, Table-2 provides example power magnitudes of the modulated encoded electrical signals (MEES1 and MEES2) to obtain a desired optical output that is a result of a predefined logical operation of the modulated encoded electrical signals (MEES1 and MEES2).

TABLE 2

Electrical configuration data

| | Power Magnitude (mW) | | | |
|---|---|---|---|---|
| Logic Operations | MEES1 State "0" | MEES1 State "1" | MEES2 State "0" | MEES2 State "1" |
| ADD | 31.7 | 25 | 16.3 | 23.6 |
| AND | 34.8 | 24.4 | 12.1 | 23.8 |
| NAND | 20.5 | 34 | 25 | 20 |
| OR | 30.5 | 20.2 | 17.5 | 26.9 |
| NOR | 30 | 37 | 23 | 16 |
| XOR | 17.8 | 31.7 | 30.5 | 16.3 |
| NXOR | 17.8 | 31.7 | 16.3 | 30.5 |

By way of example, as depicted in Table 2, to instruct the EO logic gate 102 to perform the AND operation, the controller 104 may set the power magnitudes of the MEES1 and MEES2 as specified in Table 2. For instance, to perform the AND operation, the controller 104 may generate the modulated encoded electrical signals MEES1 and MEES2 such that logic states "0" and "1" of the MEES1 are set to 34.8 milli-Watts (mW) and 24.4 mW, and the logic states "0" and "1" of the MEES2 are set to 12.1 mW and 23.8 mW. Likewise, to perform any other logical operation, the controller 104 may perform a look-up for a corresponding power magnitude and modulate the encoded electrical signals to achieve the respective power magnitudes as defined in Table 2, for example. As previously described, the controller 104 determines what logic operation to perform based on the operation selection input (see Table 1).

It may be noted that the values of the power magnitudes presented in Table 2 are for illustration purposes. The power magnitudes may vary depending on the design specifications of the EO logic gate 102 (e.g., dimensions of the MZIs and optical couplers, types of materials used to form the MZIs and optical couplers, etc.). Further, in some other examples, instead of the power magnitudes, the electrical configuration data may include voltage magnitudes or current magnitudes depending on the types of phase shifters implemented in the EO logic gate 102.

Figure 2A:
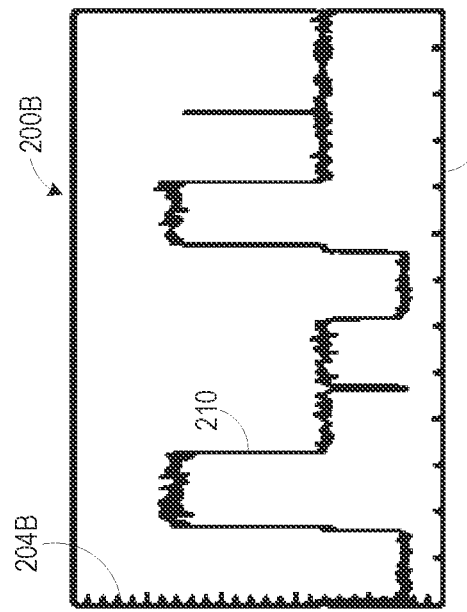
FIGS. 2A-2H depict example signal waveforms.

To verify the functioning of the reconfigurable EO logic gate 102, an 8-bit sequence was modulated as per the electrical configuration data (see Table 2) for each of the phase shifters 156 and 158. In particular, FIG. 2A depicts a graphical representation 200A depicting the modulated encoded sequences MEES1 (marked with reference numeral 206) and MEES2 (marked with reference numeral 208). In FIG. 2A, an axis 202A represents a bit sequence and a Y-axis 204A represents a logic state (e.g., a logic state "0" and a logic state "1"). In particular, the MEES1 includes a bit sequence [0, 1, 1, 0, 0, 1, 0, 1] and MEES2 includes a bit sequence [0, 1, 0, 1, 0, 1, 1, 0]. Depending on the logic operation to be performed, specific power magnitudes are set for the states 0 and 1 (see Table 2, for example). Once the modulated encoded electrical signals MEES1 and MEES2 are applied to the phase shifters 156 and 158, respectively, the output optical power was measured at the optical output port 108 using a photodiode (not shown). The signal detected by the photodiode was amplified by a low-noise amplifier which is then captured using a real-time oscilloscope. In particular, FIGS. 2B through 2H represent optical output signals measured at the optical output port 108 when modulated encoded sequences MEES1 and MEES2 of predefined power magnitudes are applied to the phase shifters 156 and 158.

Figure 2B:
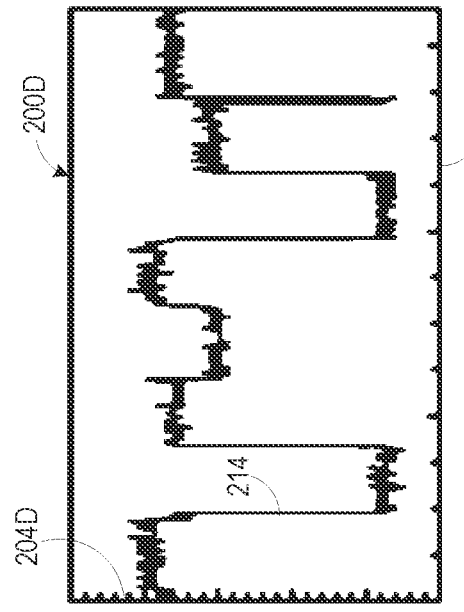

Referring now to FIG. 2B, presented is a graphical representation 200B depicting an optical output signal 210 representative of an ADD operation of the modulated encoded electrical signals MEES1 and MEES2 presented in FIG. 2A. In FIG. 2B, an axis 202B represents time in seconds and a Y-axis 204B represents optical power magnitude in arbitrary unit (a.u.). To perform the ADD operation, the controller 104 may set the logic states "0" and "1" of the modulated encoded electrical signals MEES1 and MEES2 to the respective power magnitudes defined in the electrical configuration data (see Table-2). In particular, to perform the ADD operation, the controller 104 may set logic states "0" and "1" of the MEES1 to 31.7 mW and 25 mW, and the logic states "0" and "1" of the MEES2 to 16.3 mW and 23.6 mW. As a result, the optical output signal 210 at the optical output port 108 would represent an addition of the modulated encoded electrical signals MEES1 and MEES2.

Figure 2C:
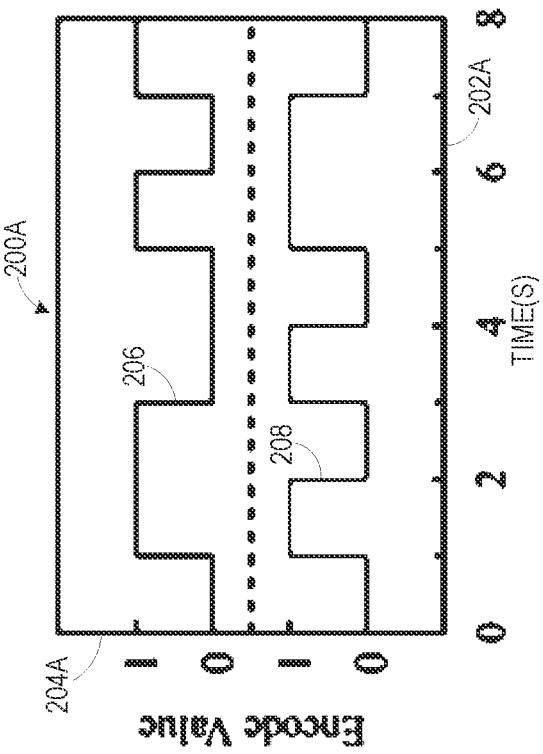

In FIG. 2C, presented is a graphical representation 200C depicting an optical output signal 212 representative of an AND operation of the modulated encoded electrical signals MEES1 and MEES2 presented in FIG. 2A. In FIG. 2C, an axis 202C represents time in seconds and a Y-axis 204C represents optical power magnitude in arbitrary unit. To perform the AND operation, the controller 104 may set the logic states "0" and "1" of the modulated encoded electrical signals MEES1 and MEES2 to the respective power magnitudes defined in the electrical configuration data (see Table-2). In particular, to perform the AND operation, the controller 104 may set logic states "0" and "1" of the MEES1 to 34.8 mW and 24.4 mW, and the logic states "0" and "1" of the MEES2 are set to 12.1 mW and 23.8 mW. As a result, the optical output signal 212 at the optical output port 108 would represent a logical combination—AND of the modulated encoded electrical signals MEES1 and MEES2.

Figure 2D:
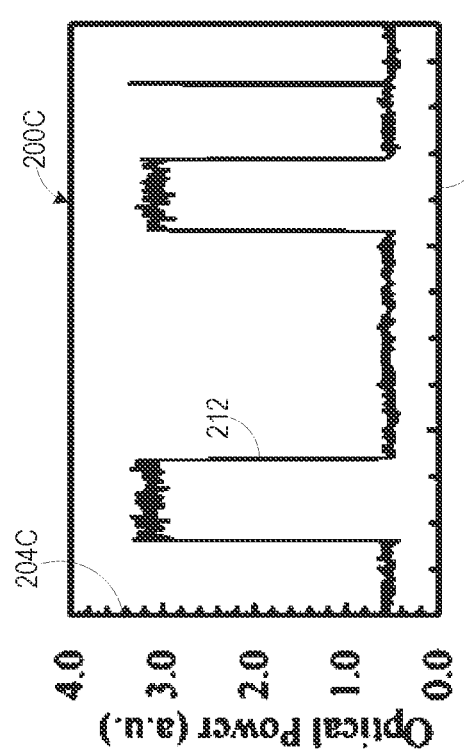

In FIG. 2D, presented is a graphical representation 200D depicting an optical output signal 214 representative of a NAND operation of the modulated encoded electrical signals MEES1 and MEES2 presented in FIG. 2A. In FIG. 2D, an axis 202D represents time in seconds and a Y-axis 204D represents optical power magnitude in arbitrary unit. To perform the NAND operation, the controller 104 may set the logic states "0" and "1" of the modulated encoded electrical signals MEES1 and MEES2 to the respective power magnitudes defined in the electrical configuration data (see Table-2). In particular, to perform the NAND operation, the controller 104 may set logic states "0" and "1" of the MEES1 to 20.5 mW and 34 mW, and the logic states "0" and "1" of the MEES2 are set to 25 mW and 20 mW. As a result, the optical output signal 214 at the optical output port 108 would represent a logical combination—NAND of the modulated encoded electrical signals MEES1 and MEES2.

Figure 2E:
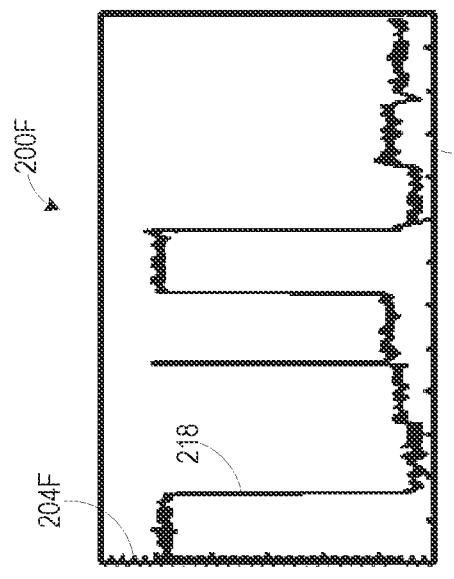

In FIG. 2E, presented is a graphical representation 200E depicting an optical output signal 216 representative of an OR operation of the modulated encoded electrical signals MEES1 and MEES2 presented in FIG. 2A. In FIG. 2E, an axis 202E represents time in seconds and a Y-axis 204E represents optical power magnitude in arbitrary unit. To perform the OR operation, the controller 104 may set the logic states "0" and "1" of the modulated encoded electrical signals MEES1 and MEES2 to the respective power magnitudes defined in the electrical configuration data (see Table-2). In particular, to perform the OR operation, the controller 104 may set logic states "0" and "1" of the MEES1 to 30.5 mW and 20.2 mW, and the logic states "0" and "1" of the MEES2 are set to 17.5 mW and 26.9 mW. As a result, the optical output signal 216 at the optical output port 108 would represent a logical combination—OR of the modulated encoded electrical signals MEES1 and MEES2.

Figure 2F:
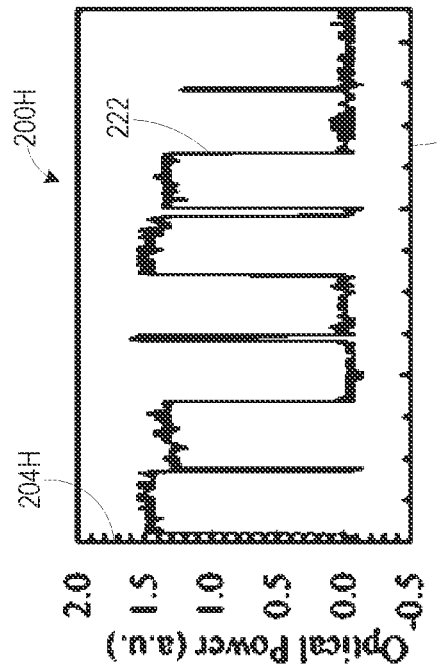

In FIG. 2F, presented is a graphical representation 200F depicting an optical output signal 218 representative of a NOR operation of the modulated encoded electrical signals MEES1 and MEES2 presented in FIG. 2A. In FIG. 2F, an axis 202F represents time in seconds and a Y-axis 204F represents optical power magnitude in arbitrary unit. To perform the NOR operation, the controller 104 may set the logic states "0" and "1" of the modulated encoded electrical signals MEES1 and MEES2 to the respective power magnitudes defined in the electrical configuration data (see Table-2). In particular, to perform the NOR operation, the controller 104 may set logic states "0" and "1" of the MEES1 to 30 mW and 37 mW, and the logic states "0" and "1" of the MEES2 are set to 23 mW and 16 mW. As a result, the optical output signal 218 at the optical output port 108 would represent a logical combination—NOR of the modulated encoded electrical signals MEES1 and MEES2.

Figure 2G:
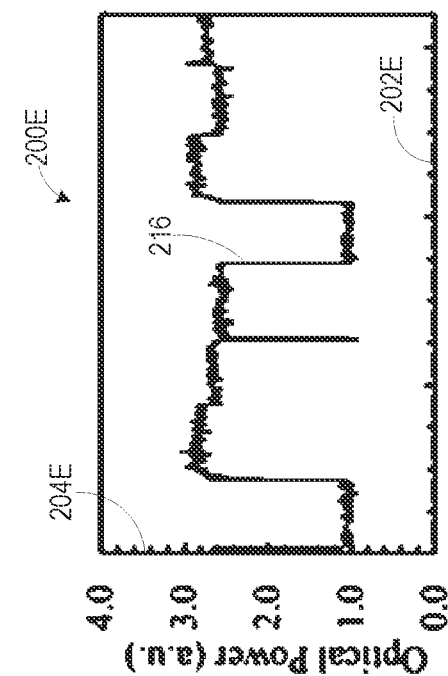

In FIG. 2G, presented is a graphical representation 200G depicting an optical output signal 220 representative of an XOR operation of the modulated encoded electrical signals MEES1 and MEES2 presented in FIG. 2A. In FIG. 2G, an axis 202G represents time in seconds and a Y-axis 204G represents optical power magnitude in arbitrary unit. To perform the XOR operation, the controller 104 may set the logic states "0" and "1" of the modulated encoded electrical signals MEES1 and MEES2 to the respective power magnitudes defined in the electrical configuration data (see Table-2). In particular, to perform the XOR operation, the controller 104 may set logic states "0" and "1" of the MEES1 to 17.8 mW and 31.7 mW, and the logic states "0" and "1" of the MEES2 are set to 30.5 mW and 16.3 mW. As a result, the optical output signal 218 at the optical output port 108 would represent a logical combination-XOR of the modulated encoded electrical signals MEES1 and MEES2.

Figure 2H:
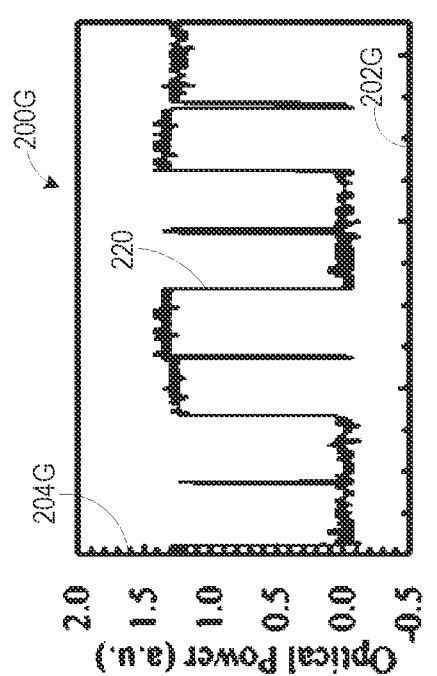

In FIG. 2H, presented is a graphical representation 200H depicting an optical output signal 222 representative of an NXOR operation of the modulated encoded electrical signals MEES1 and MEES2 presented in FIG. 2A. In FIG. 2H, an axis 202H represents time in seconds and a Y-axis 204H represents optical power magnitude in arbitrary unit. To perform the NXOR operation, the controller 104 may set the logic states "0" and "1" of the modulated encoded electrical signals MEES1 and MEES2 to the respective power magnitudes defined in the electrical configuration data (see Table-2). In particular, to perform the NXOR operation, the controller 104 may set logic states "0" and "1" of the MEES1 to 17.8 mW and 31.7 mW, and the logic states "0" and "1" of the MEES2 are set to 16.3 mW and 30.5 mW. As a result, the optical output signal 218 at the optical output port 108 would represent a logical combination—NXOR of the modulated encoded electrical signals MEES1 and MEES2.

Table 3 presented below represents a measured truth table reflecting the graphical data presented in FIGS. 2A-2H.

TABLE 3

Measured Truth Table

| Name | Bit Sequences | | | | | | | |
|---|---|---|---|---|---|---|---|---|
| MEES1 | 0 | 1 | 1 | 0 | 0 | 1 | 0 | 1 |
| MEES2 | 0 | 1 | 0 | 1 | 0 | 1 | 1 | 0 |
| ADD | 0 | 2 | 1 | 1 | 0 | 2 | 1 | 1 |
| AND | 0 | 1 | 0 | 0 | 0 | 1 | 0 | 0 |
| NAND | 1 | 0 | 1 | 1 | 1 | 0 | 1 | 1 |
| OR | 0 | 1 | 1 | 1 | 0 | 1 | 1 | 1 |
| NOR | 1 | 0 | 0 | 0 | 1 | 0 | 0 | 0 |
| XOR | 0 | 0 | 1 | 1 | 0 | 0 | 1 | 1 |
| NXOR | 1 | 1 | 0 | 0 | 1 | 1 | 0 | 0 |

Figure 3:
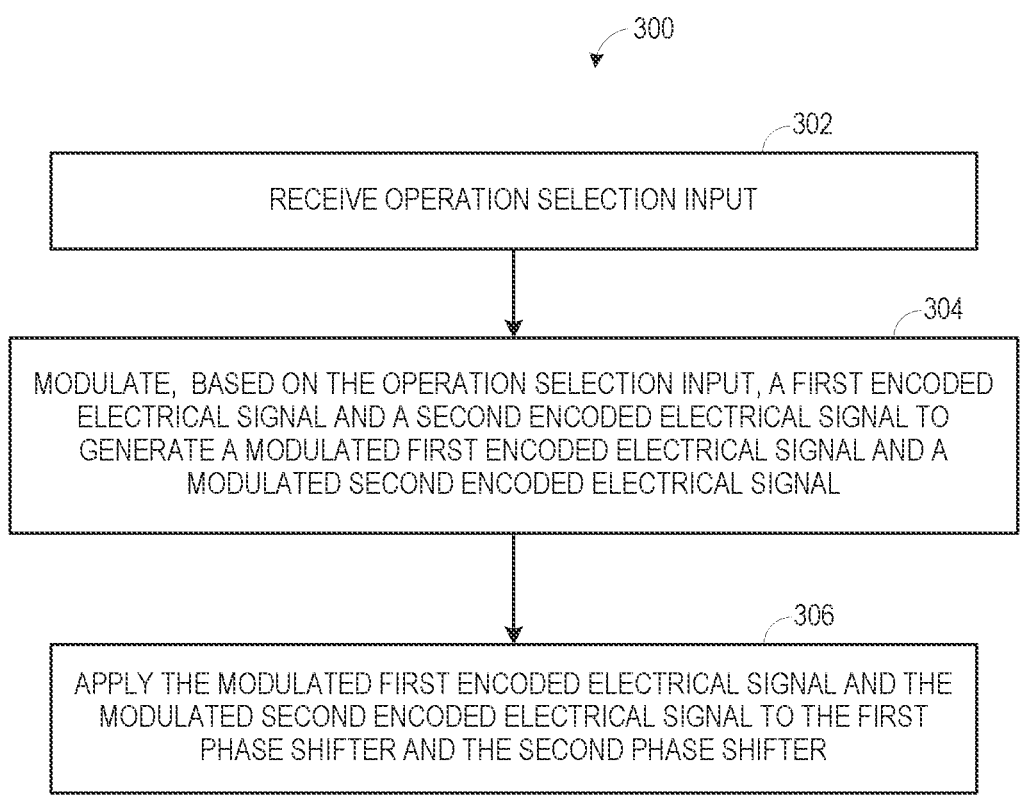
FIG. 3 depicts a flow diagram of an example method for operating an example EO logic gate.

Referring now to FIG. 3, a flowchart of an example method 300 for operating an example EO logic gate (e.g., the EO logic gate 102 of FIG. 1) is depicted. For illustration purposes, the method 300 is described with reference to the system 100 of FIG. 1. In some examples, the operations described in the flowchart of FIG. 3 may be performed by a controller, such as, the controller 104. In one example, a processing resource (e.g., the processing resource 110) in the controller 104 may execute program instructions (e.g., the instructions 114) stored in the machine-readable storage medium (e.g., machine-readable storage medium 112) to execute the operations performed by the controller. As an alternative or in addition to retrieving and executing instructions to perform the operations described in the flowcharts, the operations described in FIG. 3 may be performed by implementing one or more electronic circuits that include electronic components such as an FPGA, ASIC, or other electronic circuits.

At step 302, the controller 104 receives an operation selection input specifying a logic operation to be performed via the EO logic gate 102. The controller 104 may receive the operation selection input from an external device or a circuit.

Further, at step 304, the controller 104, based on the operation selection input, modulates a first encoded electrical signal (e.g., EES1) and a second encoded electrical signal (e.g., EES2) to generate a modulated first encoded electrical signal (e.g., MEES1) and a modulated second encoded electrical signal (e.g., MEES2). The encoded electrical signals EES1 and EES1 may be received by controller 104 from the external device or circuit or generated by the controller 104 itself. In an example implementation, the modulated encoded electrical signals MEES1 and MEES2 may be generated by amplitude modulating the signals EES1 and EES2 based on the operation selection input. In particular, based on the received operation selection input, the controller 104 may first determine the logic operation that needs to be performed by referencing the mapping between the operation selection inputs and corresponding logic operations (see Table 1). For example, if the operation selection input is "001", the controller 104 may determine the logic operation to be performed is an AND operation. Then based on the determined logic operation, the controller 104 may set power magnitudes for the signals EES1 and EES2 based on the electrical configuration data (see Table 2). For example, to perform the AND operation, the controller 104 may set the power magnitudes for logic states "0" and "1" of the MEES1 to 34.8 mW and 24.4 mW, and the power magnitudes for the logic states "0" and "1" of the MEES2 to 12.1 mW and 23.8 mW.

Furthermore, at step 306, the controller 104 may apply the modulated first encoded electrical signal (e.g., the MEES1) and the modulated second encoded electrical signal (e.g., the MEES2) to the first phase shifter 156 and the second phase shifter 158, respectively. Based on the power magnitudes of the respective received modulated encoded electrical signals MEES1 and MEES2, the first phase shifter 156 and the second phase shifter 158 apply phase shifts respectively to a first optical signal propagating through the first MZI 116 and a second optical signal propagating through the second MZI 118. The phase shifts applied to the first and second optical signals may cause the optical output signal at the optical output port 108 to vary based on the logic operation of the first encoded electrical signal and the second encoded electrical signal.

Figure 4:
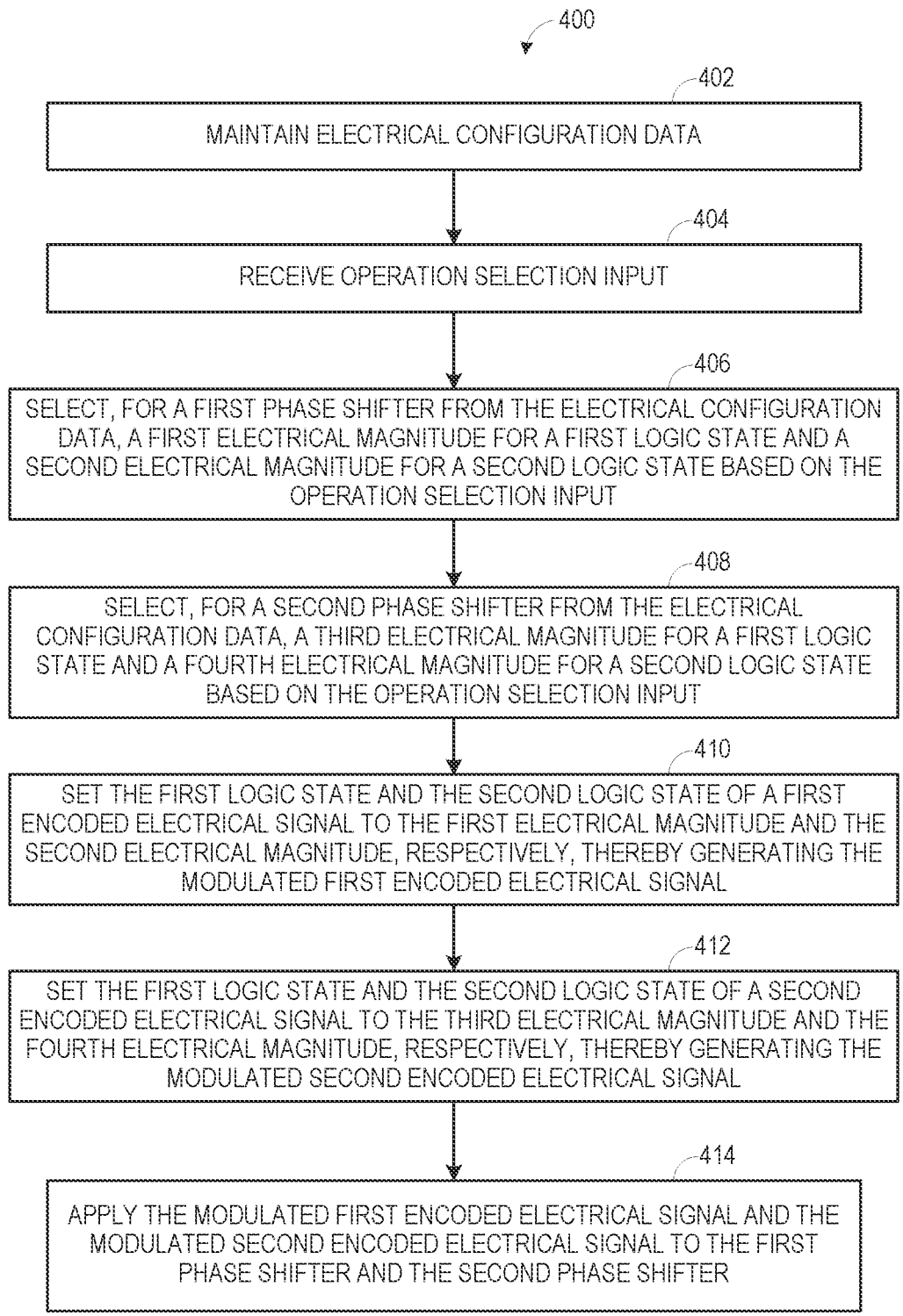
FIG. 4 depicts a flow diagram of another example method for operating an example EO logic gate.

Turning now to FIG. 4, a flowchart of an example method 400 for operating an example EO logic gate (e.g., the EO logic gate 102 of FIG. 1) is depicted. For illustration purposes, the method 400 is described with reference to the system 100 of FIG. 1. In some examples, the operations described in the flowchart of FIG. 4 may be performed by a controller, such as, the controller 104 of FIG. 1. In one example, a processing resource (e.g., the processing resource 110) in the controller 104 may execute program instructions (e.g., the instructions 114) stored in the machine-readable storage medium (e.g., the machine-readable storage medium 112) to execute the operations performed by the controller 104. As an alternative or in addition to retrieving and executing instructions to perform the operations described in the flowcharts, the operations described in FIG. 4 may be performed by implementing one or more electronic circuits that include electronic components such as an FPGA, ASIC, or other electronic circuits. Also, certain details of the operations already described in any of the earlier drawings are not repeated herein for the sake of brevity.

At step 402, the controller 104 maintains electrical configuration data (see Table 2, for example). The electrical configuration data may be pre-loaded into the machine-readable storage medium and is accessible to the processing resource of the controller 104. The electrical configuration data defines signal properties of the modulated encoded electrical signals (e.g., MEES1 and MEES2) supplied to the EO logic gate 102 to perform a given logic operation. As depicted in Table 2, in one example, the electrical configuration data includes the mapping between a logic operation and corresponding power magnitudes of the modulated encoded electrical signals MEES1 and MEES2 to the phase shifters 156 and 158, for example.

At step 404, the controller 104 receives an operation selection input specifying a logic operation to be performed via the EO logic gate 102. The controller 104 may receive the operation selection input from an external device or a circuit. Further, the controller 104, based on the operation selection input, modulates a first encoded electrical signal (e.g., EES1) and a second encoded electrical signal (e.g., EES2) to generate a modulated first encoded electrical signal (e.g., MEES1) and a modulated second encoded electrical signal (e.g., MEES2). Performing the modulation may include executing steps 406, 408, 410, and 412, for example.

At step 406, the controller 104 may select, for the first phase shifter from the electrical configuration data, a first electrical magnitude for a first logic state and a second electrical magnitude for a second logic state based on the operation selection input. For example, if the operation selection input is "010", the controller 104 may determine the logic operation to be performed is an OR operation. Then, based on the determined logic operation, the controller 104 may select a power magnitude of 30.5 mW for the logic state "0" and a power magnitude of 20.2 mW for the logic state "1".

Further, a step 408, the controller 104 may select, for the second phase shifter from the electrical configuration data, a third electrical magnitude for the first logic state, and a fourth electrical magnitude for the second logic state based on the operation selection input. For example, if the operation selection input is "010", the controller 104 may determine the logic operation to be performed is an OR operation. Then, based on the determined logic operation, the controller 104 may select a power magnitude of 17.5 mW for the logic state "0" and a power magnitude of 26.9 mW for the logic state "1".

Once the electrical magnitudes are selected, at step 410, the controller 104 may set the first logic state and the second logic state of the first encoded electrical signal to the first electrical magnitude and the second electrical magnitude, respectively, thereby generating the modulated first encoded electrical signal MEES1. For example, for the OR operation, the controller 104 may set the power magnitudes of the logic level "0" and the logic level "1" to 30.5 mW and 20.2 mW, respectively. Thus, the resultant modulated first encoded electrical signal MEES1 is generated with the logic level "0" and the logic level "1" set to 30.5 mW and 20.2 mW, respectively.

Further, at step 412, the controller 104 may set the first logic state and the second logic state of the first encoded electrical signal to the third electrical magnitude and the fourth electrical magnitude, respectively, thereby generating the modulated second encoded electrical signal MEES2. For example, for the OR operation, the controller 104 may set the power magnitudes of the logic level "0" and the logic level "1" to 17.5 mW and 26.9 mW, respectively. Thus, the resultant the modulated second encoded electrical signal MEES2 is generated with the logic level "0" and the logic level "1" set to 17.5 mW and 26.9 mW, respectively.

Furthermore, at step 414, the controller 104 may apply the modulated first encoded electrical signal (e.g., the MEES1) and the modulated second encoded electrical signal (e.g., the MEES2) to the first phase shifter 156 and the second phase shifter 158, respectively. As described in conjunction with FIG. 1, the application of the modulated encoded electrical signals MEES1 and MEES2 causes the first phase shifter 156 and the second phase shifter 158 to apply phase shifts respectively to a first optical signal propagating through the first MZI 116 and a second optical signal propagating through the second MZI 118 based on the power magnitudes of the received modulated encoded electrical signals MEES1 and MEES2. The phase shifts caused in the first and second optical signals may cause the optical output signal at the optical output port 108 to vary based on the logic operation of the first encoded electrical signal and the second encoded electrical signal.

Figure 5:
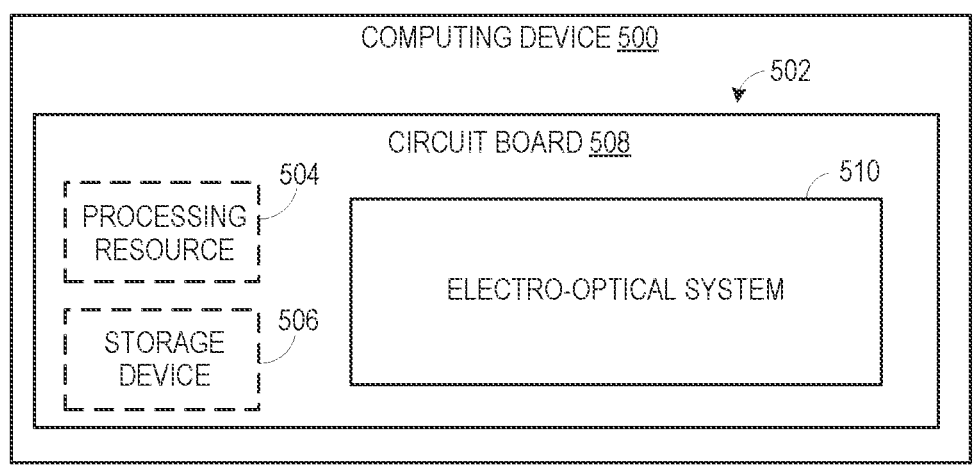
FIG. 5 depicts a block diagram of an example computing system implemented with an example EO logic gate.

Referring now to FIG. 5, a block diagram of an example computing system 500 is presented. Examples of the computing system 500 may include computers (stationary or portable), servers, storage systems, wireless access points, network switches, routers, docking stations, printers, or scanners. The computing system 500 may be offered as a stand-alone product or a packaged solution and can be utilized on a one-time full product/solution purchase or pay-per-use basis. The computing system 500 may include one or more multi-chip modules, for example, a multi-chip module (MCM) 502 to process and/or store data. In some examples, the MCM 502 may include a processing resource 504 and a storage device 506 mounted on a circuit board 508. In some examples, one or both of the processing resource 504 and a storage device 506 may be optional components on the MCM 502. In some examples, the MCM 502 may host an electro-optical system 510 on the circuit board 508. In some other examples, one or more of the processing resource 504, the storage device 506, and the electro-optical system 510 may be hosted on separate MCM (not shown). The circuit board 508 may be a printed circuit board (PCB) that includes several electrically conductive traces (not shown) to interconnect the processing resource 504, the storage device 506, and the electro-optical system 510 with each other and/or with other components disposed on or outside of the circuit board 508.

The electro-optical system 510 may be an example representative of the system 100 of FIG. 1. In particular, the electro-optical system 510 may include a controller (e.g., the controller 104) and an EO logic gate (e.g., the EO logic gate 102), and any other electrical or optical components (e.g., light sources, photodiodes, etc.) that may aid in operating the EO logic gate. The electro-optical system 510 may be implemented for several applications such as optical interconnects enabling inter datacenter communication and/or inter-chip communication, etc.

The processing resource 504 may be a physical device, for example, one or more central processing units (CPUs), one or more semiconductor-based microprocessors, microcontrollers, one or more graphics processing units (GPUs), ASICS, FPGAs, other hardware devices, or combinations thereof, capable of retrieving and executing the instructions stored in the storage device 506. The processing resource 504 may fetch, decode, and execute the instructions stored in the storage device 506. As an alternative or in addition to executing the instructions, the processing resource 504 may include at least one IC, control logic, electronic circuits, or combinations thereof that include a number of electronic components. The storage device 506 may be any electronic, magnetic, optical, or any other physical storage device that contains or stores instructions that are readable and executable by the processing resource 504. Thus, the storage device 506 may be, for example, RAM, NVRAM, an EEPROM, a storage device, an optical disc, and the like. In some embodiments, the storage device 506 may be a non-transitory storage device, where the term "non-transitory" does not encompass transitory propagating signals.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A system comprising:
   a controller configured to:
      receive an operation selection input specifying a logic operation to be performed; and
      modulate a first encoded electrical signal and a second encoded electrical signal based on the operation selection input to generate a modulated first encoded electrical signal and a modulated second encoded electrical signal; and an electro-optical (EO) logic gate connected to the controller, wherein the EO logic gate comprises:
  a first Mach Zehnder interferometer (MZI) coupled between an optical input port and an optical output port;
  a second MZI optically coupled in parallel with the first MZI;
  a first phase shifter formed adjacent to the first MZI and coupled to the controller to receive the modulated first encoded electrical signal; and
  a second phase shifter formed adjacent to the second MZI and coupled to the controller to receive the modulated second encoded electrical signal,
wherein the first phase shifter and the second phase shifter apply phase shifts respectively to a first optical signal propagating through the first MZI and a second optical signal propagating through the second MZI based on the modulated first encoded electrical signal and the modulated second encoded electrical signal, and wherein the phase shifts cause an optical output at the optical output port to vary based on the logic operation of the first encoded electrical signal and the second encoded electrical signal.

2. The system of claim 1, wherein the logic operation comprises one of an AND operation, an OR operation, a NAND operation, a NOR operation, an XOR operation, an ADD operation, or an NXOR operation.

3. The system of claim 1, wherein each of the first MZI and the second MZI comprises MZI input ports and MZI output ports.

4. The system of claim 3, further comprising:
  an input optical coupler connected to the optical input port and one of the MZI input ports of the first MZI and the second MZI, wherein the input optical coupler receives an input optical signal and distributes the input optical signal to the first MZI and the second MZI; and
  an output optical coupler connected to the optical output port and one of the MZI output ports of the first MZI and the second MZI, wherein the output optical coupler combines optical signals received from the first MZI and the second MZI to generate the optical output.

5. The system of claim 1, wherein the first phase shifter and the second phase shifter comprise one or more of metal heaters, PN junction phase shifters, PIN junction phase shifters, metal-oxide-semiconductor capacitor (MOSCAP) phase shifters, or Lithium Niobate phase shifters.

6. The system of claim 1, wherein the controller stores electrical configuration data comprising a plurality of electrical magnitudes for the first phase shifter and the second phase shifter corresponding to a plurality of logic operations and a plurality of logic states.

7. The system of claim 6, wherein the plurality of electrical magnitudes comprises one or more of a voltage magnitude, a current magnitude, or a power magnitude.

8. The system of claim 6, wherein the controller is configured to:
  select, for the first phase shifter from the electrical configuration data, a first electrical magnitude for a first logic state and a second electrical magnitude for a second logic state based on the operation selection input; and
  select, for the second phase shifter from the electrical configuration data, a third electrical magnitude for the first logic state and a fourth electrical magnitude for the second logic state based on the operation selection input.

9. The system of claim 8, wherein to modulate the first encoded electrical signal and the second encoded electrical signal, the controller is configured to:
  set the first logic state and the second logic state of the first encoded electrical signal to the first electrical magnitude and the second electrical magnitude, respectively; and
  set the first logic state and the second logic state of the second encoded electrical signal to the third electrical magnitude and the fourth electrical magnitude, respectively.

10. An EO logic gate comprising:
  a first MZI coupled between an optical input port and an optical output port;
  a second MZI optically coupled in parallel with the first MZI;
  a first phase shifter formed adjacent to the first MZI and coupled to a controller to receive a modulated first encoded electrical signal, and wherein the modulated first encoded electrical signal is generated by modulating a first encoded electrical signal based on a logic operation to be performed by the EO logic gate; and
  a second phase shifter formed adjacent to the first MZI and coupled to the controller to receive a modulated second encoded electrical signal, wherein the modulated second encoded electrical signal is generated by modulating a second encoded electrical signal based on the logic operation,
wherein the first phase shifter and the second phase shifter apply phase shifts respectively to a first optical signal propagating through the first MZI and a second optical signal propagating through the second MZI based on the modulated first encoded electrical signal and the modulated second encoded electrical signal, and wherein the phase shifts cause an optical output at the optical output port to vary based on the logic operation of the first encoded electrical signal and the second encoded electrical signal.

11. The EO logic gate of claim 10, wherein the logic operation comprises one of an AND operation, an OR operation, a NAND operation, a NOR operation, an XOR operation, an ADD operation, or an NXOR operation.

12. The EO logic gate of claim 10, wherein each of the first MZI and the second MZI comprises MZI input ports and MZI output ports.

13. The EO logic gate of claim 12, further comprising:
  an input optical coupler connected to the optical input port and one of the MZI input ports of the first MZI and the second MZI, wherein the input optical coupler receives an input optical signal and distributes the input optical signal to the first MZI and the second MZI; and
  an output optical coupler connected to the optical output port and one of the MZI output ports of the first MZI and the second MZI, wherein the output optical coupler combines optical signals received from the first MZI and the second MZI to generate the optical output.

14. The EO logic gate of claim 13, wherein the input optical coupler and the output optical coupler are 50%-50% directional couplers.

15. The EO logic gate of claim 10, wherein the first phase shifter and the second phase shifter comprise one or more of metal heaters, PN junction phase shifters, PIN junction phase shifters, metal-oxide-semiconductor capacitor (MOSCAP) phase shifters, or Lithium Niobate phase shifters.

16. A method comprising:
- receiving, by a controller, an operation selection input specifying a logic operation to be performed via an EO logic gate, wherein the EO logic gate comprises a first MZI and a second MZI optically coupled in parallel with the first MZI, a first phase shifter formed adjacent to the first MZI and a second phase shifter formed adjacent to the second MZI, and wherein the first MZI and the second MZI are optically coupled between an optical input port and an optical output port;
- modulating, by the controller based on the operation selection input, a first encoded electrical signal and a second encoded electrical signal to generate a modulated first encoded electrical signal and a modulated second encoded electrical signal; and
- applying, by the controller, the modulated first encoded electrical signal and the modulated second encoded electrical signal to the first phase shifter and the second phase shifter, respectively,
- wherein the first phase shifter and the second phase shifter apply phase shifts respectively to a first optical signal propagating through the first MZI and a second optical signal propagating through the second MZI based on the modulated first encoded electrical signal and the modulated second encoded electrical signal, and wherein the phase shifts cause an optical output signal at the optical output port to vary based on the logic operation of the first encoded electrical signal and the second encoded electrical signal.

17. The method of claim 16, further comprising storing, by the controller, an electrical configuration data comprising a plurality of electrical magnitudes for the first phase shifter and the second phase shifter corresponding to a plurality of logic operations and a plurality of logic states.

18. The method of claim 17, wherein the plurality of electrical magnitudes comprises a plurality of power magnitudes.

19. The method of claim 17, further comprising:
- selecting, for the first phase shifter from the electrical configuration data, a first electrical magnitude for a first logic state and a second electrical magnitude for a second logic state based on the operation selection input; and
- selecting, for the second phase shifter from the electrical configuration data, a third electrical magnitude for the first logic state and a fourth electrical magnitude for the second logic state based on the operation selection input.

20. The method of claim 19, wherein modulating the first encoded electrical signal and the second encoded electrical signal comprises:
- setting the first logic state and the second logic state of the first encoded electrical signal to the first electrical magnitude and the second electrical magnitude, respectively; and
- setting the first logic state and the second logic state of the second encoded electrical signal to the third electrical magnitude and the fourth electrical magnitude, respectively.

* * * * *